United States Patent [19]

Kehe et al.

[11] Patent Number: 4,675,139

[45] Date of Patent: Jun. 23, 1987

[54] METHOD OF FORMING PLASTISOL GASKETS IN CONTAINER CLOSURES FABRICATED FROM SYNTHETIC PLASTIC RESINS

[75] Inventors: Alfred W. Kehe, Berkeley; Thomas T. Fetters, Lombard, both of Ill.

[73] Assignee: Continental Can Company, Inc., Norwalk, Conn.

[21] Appl. No.: 789,978

[22] Filed: Oct. 21, 1985

[51] Int. Cl.⁴ ............................................. B29C 35/12
[52] U.S. Cl. ..................................... 264/26; 264/45.7; 264/46.6; 264/248; 264/268; 264/310; 264/DIG. 46; 264/DIG. 60; 264/DIG. 65; 425/174.8 R
[58] Field of Search ................. 264/26, 25, DIG. 46, 264/DIG. 60, DIG. 65, 310, 45.7, 46.6, 248, 268; 425/174.4, 174.8 R

[56] References Cited

U.S. PATENT DOCUMENTS

| | | | |
|---|---|---|---|
| 3,639,190 | 2/1972 | Brooke et al. | 264/26 |
| 3,791,906 | 2/1974 | Farkas | 264/26 |
| 3,804,663 | 4/1974 | Clark . | |
| 4,296,053 | 10/1981 | Doerer et al. | 264/26 |
| 4,304,744 | 12/1981 | Stroud | 264/25 |
| 4,554,347 | 11/1985 | Hawkes, Jr. | 264/25 |

FOREIGN PATENT DOCUMENTS

| | | | |
|---|---|---|---|
| 52-10365 | 1/1977 | Japan | 264/25 |
| 818418 | 8/1959 | United Kingdom | 264/26 |
| 1327583 | 8/1973 | United Kingdom . | |
| 1327543 | 8/1973 | United Kingdom . | |
| 2051660A | 1/1981 | United Kingdom | 264/25 |

*Primary Examiner*—Jeffery Thurlow
*Attorney, Agent, or Firm*—Paul Shapiro

[57] ABSTRACT

Gaskets are formed in container closures fabricated from polyolefin resins exhibiting substantially no response to heat activation by radio frequency electrical energy by introducing a vinyl chloride plastisol containing a vinyl chloride polymer resin and a plasticizer having a loss factor in the range of 0.1–12 into the closure. The closure is preheated to 55° to 100° C. by conventional means and then the plastisol is fused in the closure by exposure to a field of radio frequency electrical energy.

10 Claims, No Drawings

METHOD OF FORMING PLASTISOL GASKETS IN CONTAINER CLOSURES FABRICATED FROM SYNTHETIC PLASTIC RESINS

BACKGROUND OF THE INVENTION

1. Field of the Invention

The present invention relates to a method for forming a gasket closure for containers and more particularly to a method for forming vinyl chloride plastisol gaskets in closures formed from synthetic plastic resins.

2. The Prior Act

With the advent of commercially available synthetic plastics, i.e. easily formable thermoplastic synthetic resins, it has become common practice to form various products therefrom due to inexpensive material and production costs. Some of such products include container closures. Heretofore, container closures molded from polyolefin resins such as polyethylene and polypropylene, have incorporated a positive locking means thereon, such as screw thread or a snap lock, or likewise, coordinated with an associated container solely through a friction fit. Although these plastic closures have found wide application in the packaging field, they have been found deficient in sealing integrity for containers used for the packaging of liquids and fine powders. Such applications require the insertion of a sealing gasket or a prefabricated composite liner to provide a leak-proof seal between the closure and the container to which it is fitted. Gaskets have not been generally used in plastic closures because the thermoplastic resin such as a polyolefin resin from which the closure is molded is generally not compatible with conventional methods for forming a gasket, as such gasket forming methods employ temperatures for forming the gasket at which the olefin plastic closure undergoes softening, stress relaxation and warpage. For example, in the widely used "spin-lining method" for forming gaskets in closures, a vinyl chloride polymer based plastisol composition in an uncured, paste-like condition is dispensed from one or more nozzles into metal closure shells which are inverted on a chuck rotating at high speed. Due to centrifugal force, the plastisol compound assumes the desired configuration and shape. After being thus deposited or "flowed-in", the plastisol compound is fused (fluxed) by baking the closure shell in an oven at temperatures in the order of 160°-200° C. from ½ to 5 minutes, or the "flowed-in" compound may be molded and fused in the closure shell with hot molding punches and platens in a turret arrangement. The fact that polyolefin resins such as polyethylene and polypropylene have softening points of 90° C. and 150° C. respectively makes them poor candidate materials for closures to be spun-lined with plastisol compounds and baked at 160° C.

Other methods considered for the delivery of elastomeric gasket material to polyolefin closures include hot melt application equipment. The generally low softening temperatures, e.g., 80°-120° C. makes these hot melt materials substantially useless in providing hermetic seals in pasteurization and sterilization processes which require temperatures in the order of 70°-125° C.

There is therefore a need in the plastic closure art for a method whereby liquid plastisol compounds can be deposited at high speeds and uniform thickness in plastic closures, e.g., using spin-lining equipment, and then fluxed within the closure without damage to the dimensional and physical properties of the closure. The resultant closures would be expected to withstand sterilization and pasteurization processes.

The prior art has attempted to form sealing gaskets fabricated from vinyl chloride resin based plastisols in plastic closures. For example, U.S. Pat. No. 4,304,744 discloses the various unsuccessful attempts made by the art to overcome the problem of heat distortion of plastic closures when it is attempted to flux the vinyl chloride resin based plastisol deposited in the closure. Included in these unsuccessful attempts to solve the closure heat distortion problem was the use of alternative heating means for fusion of the plastisol, namely, induction heating (British Pat. No. 818,418) and microwave heating (British Pat. No. 1,327,583). The disadvantages of these alternative heating means are discussed at length in U.S. Pat. No. 4,304,704 and need no further discussion here.

The invention disclosed in U.S. Pat. No. 4,304,704 attempts to solve the plastic closure heat distortion problem wherein the plastic closure having deposited therein unfluxed plastisol composition is preheated by conventional means to about 5°-35° C. below the melting point of the plastic material (e.g., for polypropylene this is about 160° C.) which heating is followed by microwave heating (e.g., at 300-300,000 megahertz) to flux the plastisol. Unfortunately, it has been found that the preheating step is sufficient to cause softening, distortion and dimensional changes to the closures fabricated from plastic materials such as polyolefins such as polyethylene and polypropylene.

SUMMARY OF INVENTION

It has unexpectedly been determined that if plasticizers having a predetermined loss factor range are incorporated in a vinyl chloride polymer based plastisol gasket composition, and the plastisol gasket composition when placed in the plastic closure is preheated to about 55° C. to about 100° C. using conventional means and the heated closure fluxed by exposure to a field of radio frequency electrical energy, i.e., in the range of 1–200 megahertz, the plastic, e.g., polyolefin, closure is not softened, distorted or dimensionally changed and a gasket material of excellent quality is formed in the closure.

In accordance with the present invention there is provided a method for forming a gasket in a container closure formed from a synthetic plastic resin wherein a plastisol mixture containing a vinyl chloride polymer resin and liquid plasticizer having a loss factor in the range of 0.1 to about 12 is introduced into the plastic closure, the closure is preheated by conventional means to about 60° to about 100° C. and the preheated closure is then dielectrically heated and fused to form the gasket by exposure to a field of radio frequency electric energy in the order of about 1 to about 200 megahertz.

By the practice of the present invention synthetic plastic resin closures can be lined with plastisol gasket materials to uniform thickness using conventional spin-lining equipment and fused without encountering heat distortion and warpage.

DETAILED DESCRIPTION OF THE INVENTION

The use of electromagnetic energy at radio frequencies is known to the art for heating many materials, including some which conduct electric currents very poorly or not at all. The latter are of a class of materials called dielectrics; the heating process is termed dielectric heating. For dielectric heating, two ranges of frequencies are used namely frequencies in the range of 1-200 megahertz, referred to in the art as high frequency or radio-frequency heating, and frequencies above 800 megahertz, referred in the art as microwave heating. The practice of the present invention is restricted to the use of radio-frequency dielectric heating sources to effect fusion of the plastisol compound.

In dielectric heating, the material to be heated is placed between two metal plates or electrodes. A generator applies to the plates a high-frequency current of 1 to 200 megahertz that sets up an electric field in and around the material. The material absorbs energy at a rate given by the equation:

$$P = 0.555 f E^2 \epsilon' \tan \delta \times 10^{-6}$$

where P=heat generated in watts/cc (dielectric loss), f=frequency in magahertz, E=field strength in V/cm, $\epsilon'$=dielectric constant and tan $\delta$=loss tangent.

The ease with which any material may be dielectrically heated is determined by its dielectric constant and its loss tangent. The product $\epsilon' \times \tan \delta$ is referred to in the art as the loss factor and such factor is a convenient index to the relative ease of heating of a material. Polyethylene which has a dielectric constant of 2.35 and a loss factor of 0.0005 and polypropylene which has a dielectric constant of 2.25 and a loss factor of 0.00035 show little or no response to dielectric heating. It is has been determined that plasticizers having loss factor in the range of 0.1 to about 12 when incorporated in vinyl chloride polymers in accordance with the practice of present invention enable the resultant plastisol compound to be fused in less than two minutes in polyolefin closures without causing heat distortion of the closure. Polyvinyl chloride which has a loss factor of 0.023 also exhibits some but not substantial response to dielectric heating.

It has been determined that generally the loss tangent for most constituents of plastisol compositions possess a variable loss tangent that is dependent upon temperature. Generally, the loss tangent is at a minimum up to about 55° C. Above this temperature, the loss tangent increases abruptly, thereby facilitating the generation of dielectric heat. Due to this loss tangent characteristic, the unfluxed plastisol lined plastic closure can be heated to 55° C. or more in a conventional oven before being subjected to radio frequency heating whereby the radio frequency heating is rendered more efficient and efficacious in effecting plastisol fusion. Temperatures substantially above 100° C., e.g., 120° C. or more, are to be avoided in the preheat step as such temperatures will cause softening and distortion of the plastic closure body. Therefore, to promote fusion of the plastisol with radio frequency heating with the committant avoidance of heat distortion of the plastic closure, the unfluxed plastisol lined closure is preheated, using conventional means, such as an air oven, at a temperature in the range of about 55° C. to about 100° C. and preferably about 60° to about 80° C. for about 10 to about 60 seconds before being subjected to radio frequency heating to fuse the plastisol.

To effect radio frequency heating of vinyl chloride polymer plastisols containing plasticizers having loss factors in the range of 0.1 to about 12 following the practice of the present invention, a frequency of between 10 to 50 megahertz is generally employed and a frequency of 20 to 40 megahertz is preferred. Any source having sufficient power output, e.g., 1 to 20 kilowatt (KW) may be used, outputs in the range of 5 to 15 KW being preferred. With such power outputs, fluxing of plastisol compounds prepared in accordance with the practice of the present invention can be accomplished in time periods ranging from 30 seconds to two minutes.

During RF heating of the polymer plastisol in the plastic closure, the air surrounding the closures is advantageously heated to about 50° to about 70° C. to prevent plasticizer condensation and maintain temperature uniformity of the closure.

The term "synthetic plastic resin" as used herein means any thermoplastic synthetic resin that does not soften below 80° C., and such term includes within its meaning thermoplastic materials such as polyethylene terephthalate, polycarbonate as well as polyolefins such as ethylene polymers and copolymers and propylene polymers and copolymers such as medium and high density polyethylene, polyproplene, ethylene-propylene copolymers, ethylene-butene copolymers, ethylene-hexene, copolymers, and polybutylene.

The synthetic plastic resin used for closure fabrication may contain electrically non-conductive fillers such talc, mica, clay and $TiO_2$ to improve the opacity and physical properties of the closure material. For example, the incorporation of finely divided (e.g., 200-325 mesh) platy type fillers such as mica and talc at concentrations of about 20 to about 50 percent by weight in polyolefins such as polypropylene and high density polyethylene significantly aid in accelerating the fusion of the plastisol composition. It is believed that the presence of the platy fillers reduces the radiation transparency of the polyolefin resin. Further, the platy fillers significantly increase the hardness, heat distortion and gas barrier properties of the plastic especially when compared to non-platy fillers such as $CaSO_4$ or $CaCO_3$.

The vinyl chloride polymer plastisol composition used in the practice of the present invention is a semi-liquid paste vinyl chloride polymer resin which is paste forming with the plasticizer at a temperature below the fluxing temperature of the plastisol compound which is originally opaque and paste-like undergoes a series of physical changes and with increasing temperatures, the plastisol increases in tensile strength and gradually loses its opacity. The point at which the plastisol forms a brittle friable film is referred to in the art as the "gel point". The point at which opacity is lost is referred to in the art as the temperature of "clear point fusion". At temperatures of 160° to 200° C., the plastisol reaches its maximum tensile strength, elongation and clarity. It is preferred in the practice of the present invention that the plastisol compounds have as low a gel point and a clear point fusion temperature as possible. Mixtures of plasticizers and vinyl chloride polymers having a relative viscosity range between 1.80 and 2.60 when measured in accordance with ASTM D-1243-60 Method A or a number average molecular weight of 45,000 to 75,000 having gel points in the range of 75°-85° C. and clear fusion points in the range of 95° C. to 150° C. are preferred in the practice of the present invention.

Vinyl chloride polymer resins used in the practice of the present invention include homopolymer, i.e., polyvinyl chloride, as well as copolymers with a minor amount of copolymerizable ethylenically unsaturated nonomer. Generally, the copolymerizable monomer is used in an amount of 20% or less, and preferably 10% or less, e.g., 5%. As illustrative copolymerizable materials, there can be used vinyl acetate, vinylidene chloride, acrylonitrile, trichloroethylene, maleic anhydride and dibutyl maleate. Polyvinyl chloride is the vinyl chloride polymer resin preferred for use in the process of the present invention.

Plasticizer compositions having loss factors in the range of 0.1 to about 12 are preferred in the practice of the present invention. These plasticizer compositions are known to the art. For example, in an article entitled "Dielectric Constants of Plasticizers As Predictors of Compatibility with Polyvinyl Chloride", which appeared in Polymer Engineering and Science, October 1967, pages 295–309, there are listed over 100 plasticizers for polyvinyl chloride, their dielectric constants and loss factors. Plasticizers especially suitable for the practice of the present invention are listed below:

| Plasticizer | Loss Factor (at 1 Kc) |
| --- | --- |
| Diisodecyl phthalate | 0.118 |
| Butylphthalyl butyl glycolate | 11.10 |
| Butylbenzyl phthalate | 8.45 |
| Diisoctyl phthalate | 0.262 |
| Dibutyl phthalate | 5.45 |
| Acetyl tributylcitrate | 1.95 |

Plasticizers derived from phthalic acid are most preferred in the practice of the present invention.

In preparing the plastisol composition suitable as gaskets for closures in accordance with the practice of the present invention it has been found that for each 100 parts of vinyl chloride polymer resin, 40 to 100 parts of the plasticizer are generally used and 50 to 90 parts of the plasticizer are preferred.

Other materials such as pigments, lubricants and stabilizers may be included in the preparation of the plastisol compositions used in the practice of the present invention. Generally pigments are included in the plastisol composition at a concentration of 1 to 3 parts per hundred parts of vinyl chloride polymer resin (PHR), the lubricant is incorporated at 1 to 10 PHR and the stabilizer is incorporated at 1 to 2 PHR.

Pigments that can be used in the preparation of the plastisol compositions of the present invention include carbon black, titanium dioxide and zinc oxide. The pigments are included in the plastisol compositions for opaqueness and color.

Lubricants are normally included in the plastisol compositions in order to impart suitable torque values to lined closures of the type that have to be rotated, e.g., lug or threaded caps) for removal. Suitable lubricants include fatty acids such as stearic and oleic acid, fatty acid amides, silicone oils such as dimethyl polysiloxane and methyl hydrogen polysiloxane and paraffinic waxes.

A stabilizer is included in the plastisol to improve the resistance of the plastisol to the deleterious effects of light, oxygen and heat. Suitable stabilizer materials are the so-called "acid acceptor" compounds which are capable of reacting with and neutralizing any hydrogen chloride which might split off from the vinyl chloride polymer resin during fusion. Examples of stabilizers which can be employed are epoxidized oils, such as soybean and linseed, calcium stearate, zinc stearate, magnesium stearate, aluminum stearate, calcium ricinoleate, zinc ricinoleate, calcium laurate, dibutyl tin dilaurate and other fatty soaps of these metals.

The plastisol compositions of the present invention are prepared by simply blending the ingredients in the desired proportions.

If desired, foamed liners can be prepared by the practice of the present invention by incorporating a chemical blowing agent in the plastisol composition.

The chemical blowing agents which may be incorporated in the plastisol compositions used in the practice of the present invention should have decomposition temperatures above the gel point temperatures of the vinyl plastisols. A blowing agent possessing a decomposition temperature above the gel temperature of the plastisol and within a temperature range of 100° to 150° C. is preferred. Typical blowing agents which may be employed include nitrogen evolving agents, such as, e.g., p, p'-oxybis (benzensulfonyl hydrazide), and N,N'-dimethyl-N,N'-dinitroso terephthalamide. The blowing agents are incorporated in the plastisol in amounts ranging from 0.5 to 15 parts of the blowing agent per 100 parts of the vinyl chloride polymer resin. Amounts of from 0.5 to 3 parts per hundred parts of resin have been found to be particularly useful.

The following Example illustrates the invention.

EXAMPLE I

A vinyl chloride polymer based plastisol composition was prepared having the following composition:

| | PHR |
| --- | --- |
| Polyvinyl chloride emulsion grade resin | 75 |
| Polyvinyl chloride suspension grade resin | 25 |
| Diisodecyl phthalate | 40 |
| Butylbenzyl phthalate | 15 |
| Zinc stearate | 2 |
| Paraffin wax | 1 |
| p,p'-Oxybisbenzene sulfonyl hydrazide | 1.5 |
| Silicone oil | 0.5 |

Vacuum holding closures, 30 mm in diameter, having a depending tamperband were injection molded from polypropylene and 0.75 gram of the deaerated plastisol composition was spun lined into the interior closure shell to a thickness of 0.060 inches.

The spun lined closures were mounted on a conveyor belt and passed into a gas fired oven wherein the closures were heated to 60° C. over a 15 second period. The heated closures were then passed immediately over the electrodes of a RF heating unit to heat and fuse the plastisol compound.

The RF heating unit was comprised of a 15 KW radio frequency (RF) generator electrically connected to one side of the voltage grid of a RF applicator enclosed in the radiation shielded oven. The oven was equipped with a heater which maintained the oven at a temperature of 50°–60° C. The closures were conveyed on a belt past the electrodes. The generator was operated at 27.12 megahertz and a plate voltage of 10 KW.

The spun lined closures were passed through the RF heating unit with the closures being rotated for a total exposure time to RF heating of 90 seconds to obtain the fused gasket material.

After fusion of the plastisol in the closure, the assembly was allowed to cool.

The resultant fused gasket material had a thickness of 0.10 inch.

The so formed closures were sealed onto 16 ounce bottles provided with a neck finish of the type adapted to be sealed by plastic closures provided with tamperbands. Immediately prior to the application of the closure, the bottles had been filled with hot (192°-200° F.) water to a predetermined level. As the water cooled in the sealed bottle a vacuum developed in the headspace. When sealed in this manner with a commercially acceptable closure, an internal vacuum in the order of 14 inches mercury normally develops in the bottle indicating that acceptable sealing has taken place. After storage for at least two weeks the opening torque required to remove plastisol lined metal closures is required to be in the range of 5 to 20 inch pounds (in-lbs). Opening torques above this range are considered unacceptable for consumer acceptance.

The bottle sealed with the closures prepared in accordance with Example I were stored for 2 weeks and then evaluated for commercial utility. The tests comprised measuring the vacuum in the sealed bottle headspace, the torque required to break the seal and engage the tamperband of the closure against a bead provided on the bottle finish (torque 1) and the torque required to break the band on the bead (torque 2).

The results of these tests are recorded below:

| Test Variable | Average* Value |
|---|---|
| Torque 1 | 17-21 in.-lbs. |
| Torque 2 | 10-19 in.-lbs. |
| Internal Vacuum | 14 inches |

*Average of 6 closures.

By way of contrast the procedure of Example I was repeated with the exception that the closure was heated at a temperature of 130° C. prior to fluxing of the plastisol by radio frequency heating. The plastisol lined polypropylene closures could not be sealed onto 16 ounce bottles in the manner of the Example because they were distorted and dimensionally changed at the thread and tamperband portion.

By way of contrast the procedure of the Example was repeated with the exception that the closure was not heated prior to fluxing of the plastisol by radio frequency heating. The plastisol lined polypropylene closures could not be sealed onto 16 ounce bottles because the plastisol was not completely fluxed.

EXAMPLE II

The procedure of Example I was repeated with the exception that 40 percent by weight of talc was incorporated in the polypropylene resin from which the closures were injection molded. The spun lined plastisol in the preheated closure is exposed to RF heating for 30 seconds to obtain a fused gasket material.

What is claimed is:

1. A method for forming gaskets in closure shells comprising in sequence,
   introducing a plastisol compound into the closure, forming the plastisol into a gasket of the desired shape, the closure being formed of a synthetic thermoplastic resin having a softening point greater than 80° C. and the plastisol being comprised of a vinyl chloride polymer and a plasticizer,
   heating the closure containing the plastisol to a temperature of about 55° to about 100° C.,
   fluxing the plastisol in the closure by dielectrically heating the plastisol by exposure to a source of radio frequency electrical energy and then
   allowing the fluxed plastisol to cool and form the gasket.
2. The method of claim 1 wherein the plasticizer has a loss factor of 0.1 to about 12.
3. The method of claim 1 wherein the vinyl chloride polymer is polyvinyl chloride.
4. The method of claim 1 wherein the plasticizer is diisodecyl phthalate.
5. The method of claim 1 wherein the plasticizer is butylbenzyl phthalate.
6. The method of claim 1 wherein the synthetic thermoplastic resin is polypropylene.
7. The method of claim 1 wherein the plastisol is comprised of 100 parts of the vinyl chloride polymer and 50 to 90 parts plasticizer.
8. The method of claim 1 wherein the source of radio frequency energy is in the range of about 1 to 200 megahertz.
9. The method of claim 1 wherein about 20 to about 50 percent by weight of a platy type filler is incorporated in the synthetic thermoplastic resin.
10. The method of claim 9 wherein the platy type filler is talc.

* * * * *

REEXAMINATION CERTIFICATE (891st)
United States Patent [19]
Kehe et al.

[11] B1 4,675,139

[45] Certificate Issued  Jul. 5, 1988

[54] METHOD OF FORMING PLASTISOL GASKETS IN CONTAINER CLOSURES FABRICATED FROM SYNTHETIC PLASTIC RESINS

[75] Inventors: Alfred W. Kehe, Berkeley; Thomas T. Fetters, Lombard, both of Ill.

[73] Assignee: Continental Can Company, Inc., Norwalk, Conn.

Reexamination Request:
No. 90/001,343, Oct. 1, 1987

Reexamination Certificate for:
Patent No.: 4,675,139
Issued: Jun. 23, 1987
Appl. No.: 789,978
Filed: Oct. 21, 1985

[51] Int. Cl.⁴ ............................................. B29C 35/12
[52] U.S. Cl. .................................. 264/26; 264/45.7; 264/46.6; 264/248; 264/268; 264/310; 264/DIG. 46; 264/DIG. 60; 264/DIG. 65; 425/174.8 R
[58] Field of Search .......... 264/25, 26, 268, DIG. 46; 425/174.8 R

[56] References Cited

U.S. PATENT DOCUMENTS

| | | | |
|---|---|---|---|
| 4,244,481 | 1/1981 | Kornelis | 215/348 |
| 4,499,036 | 2/1985 | Hawkes | 264/26 |

FOREIGN PATENT DOCUMENTS

| | | |
|---|---|---|
| 200149.4 | 9/1985 | European Pat. Off. |
| 2378996 | 8/1978 | France |
| 155007/84 | 9/1984 | Japan |
| 80/3426 | 6/1981 | South Africa |
| 1592222 | 7/1981 | United Kingdom |
| 2116529 | 9/1983 | United Kingdom |
| WO84/00346 | 2/1984 | World Int. Prop. O. |

OTHER PUBLICATIONS

Darby, et al., "Dielectric Constants of Plasticizers as Predictors of Compatibility with Polyvinyl Chloride," Oct., 1967, pp. 295-309, Polymer Engineering and Science.

*Primary Examiner*—Jeffery Thurlow

[57] ABSTRACT

Gaskets are formed in container closures fabricated from polyolefin resins exhibiting substantially no response to heat activation by radio frequency electrical energy by introducing a vinyl chloride plastisol containing a vinyl chloride polymer resin and a plasticizer having a loss factor in the range of 0.1–12 into the closure. The closure is preheated to 55° to 100° C. by conventional means and then the plastisol is fused in the closure by exposure to a field of radio frequency electrical energy.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *